(12) United States Patent
Tran

(10) Patent No.: US 7,683,891 B2
(45) Date of Patent: Mar. 23, 2010

(54) EQUALIZING REFERENCE SURFACE CAPACITANCE WITH UNEVEN THICKNESS

(75) Inventor: Bich Quy Tran, San Jose, CA (US)

(73) Assignee: Synaptics Incorporated, Santa Clara, CA (US)

( * ) Notice: Subject to any disclaimer, the term of this patent is extended or adjusted under 35 U.S.C. 154(b) by 1112 days.

(21) Appl. No.: 11/316,556

(22) Filed: Dec. 22, 2005

(65) Prior Publication Data

US 2007/0144795 A1 Jun. 28, 2007

(51) Int. Cl.
*G06F 3/041* (2006.01)
(52) U.S. Cl. .................. 345/173; 345/174; 345/165; 73/335.04
(58) Field of Classification Search .......... 345/173, 345/174, 165; 73/335.04; 338/295
See application file for complete search history.

(56) References Cited

U.S. PATENT DOCUMENTS

| | | | |
|---|---|---|---|
| 4,529,959 A * | 7/1985 | Ito et al. ................ 338/295 |
| 5,304,937 A | 4/1994 | Meyer |
| 5,374,787 A | 12/1994 | Miller et al. |
| 5,394,096 A | 2/1995 | Meyer |
| 5,495,077 A | 2/1996 | Miller et al. |
| 5,543,590 A | 8/1996 | Gillespie et al. |
| 5,543,591 A | 8/1996 | Gillespie et al. |
| 5,648,642 A | 7/1997 | Miller et al. |
| 5,650,597 A | 7/1997 | Redmayne |
| 5,841,078 A | 11/1998 | Miller et al. |
| 5,880,411 A | 3/1999 | Gillespie et al. |
| 5,914,465 A | 6/1999 | Allen et al. |
| 5,920,310 A | 7/1999 | Faggin et al. |
| 6,002,594 A | 12/1999 | Ledin et al. |
| 6,028,271 A | 2/2000 | Gillespie et al. |
| 6,137,427 A | 10/2000 | Binstead |
| 6,188,391 B1 | 2/2001 | Seely et al. |
| 6,239,389 B1 | 5/2001 | Allen et al. |
| 6,297,811 B1 | 10/2001 | Kent et al. |
| 6,380,931 B1 | 4/2002 | Gillespie et al. |
| 6,388,655 B1 * | 5/2002 | Leung ................ 345/157 |
| 6,450,026 B1 * | 9/2002 | Desarnaud ............ 73/335.04 |
| 6,489,899 B1 | 12/2002 | Ely et al. |
| 6,610,936 B2 | 8/2003 | Gillespie et al. |
| 6,667,740 B2 | 12/2003 | Ely et al. |
| 7,321,361 B2 * | 1/2008 | Sato et al. .................. 345/173 |
| 2006/0038791 A1 | 2/2006 | Mackey |
| 2007/0013678 A1 * | 1/2007 | Nakajima et al. ........... 345/174 |
| 2007/0222762 A1 * | 9/2007 | Van Delden et al. ........ 345/173 |
| 2008/0246735 A1 * | 10/2008 | Reynolds et al. ............ 345/173 |

FOREIGN PATENT DOCUMENTS

JP 07160396 A * 6/1995

* cited by examiner

*Primary Examiner*—Amare Mengistu
*Assistant Examiner*—Joseph G Rodriguez

(57) ABSTRACT

One embodiment in accordance with the invention includes a capacitive sensing apparatus that includes a capacitive sensor configured to sense an object proximate to a physical capacitive sensing reference surface. The capacitive sensing apparatus also includes a plurality of dielectric materials disposed between the capacitive sensor and the physical capacitive sensing reference surface. Note that at least one of the plurality of dielectric materials has a non-uniform thickness. The plurality of dielectric materials can be configured such that capacitive coupling between the capacitive sensor and the object proximate to the physical capacitive sensing reference surface is substantially constant across the physical capacitive sensing reference surface.

22 Claims, 11 Drawing Sheets

EQUALIZING REFERENCE SURFACE CAPACITANCE WITH UNEVEN THICKNESS

BACKGROUND

Conventional computing devices provide several input options for enabling a user to control such a computing device. For example, a user can use one or more physical keys of an alphanumeric keyboard communicatively connected to the computing device in order to control the computing device. Additionally, a user can use a movable cursor control device such as a mouse, a trackball, or a joystick communicatively connected to the computing device. Moreover, touch sensing technology can be used to provide an input option for user control of a computing device or other electronic device. The user may use the input device to indicate desired actions in menu navigation, cursor control, game play, and inputting a choice or a selection.

Within the broad category of touch sensing technology there exist capacitive sensing touchpad devices. Typically capacitive sensing touchpad devices are implemented with an input region in a flat or planar manner as shown in FIG. 1. FIG. 1 is a side sectional view of an exemplary conventional art design of a capacitive sensing touchpad 100 wherein a capacitive sensor 104 (which is well known in the art) can sense through a flat dielectric material 102. However, it can be desirable to produce a capacitive sensing touchpad device in the shape of a concave bowl, convex surface, or other non-flat shape. For example, the non-flat shape may be designed for industrial design reasons such as aesthetic appeal, or for functional reasons such as to ergonomically fit and to accompany the range of motion of a user's finger or thumb. One of the disadvantages of producing such a non-flat shaped capacitive sensing touchpad device is that it can result in non-uniform signal output due to non-uniform capacitive coupling, or be costly to design and fabricate.

The invention may address one or more of the above-identified issues.

SUMMARY

One embodiment in accordance with the invention includes a capacitive sensing apparatus that includes a capacitive sensor configured to sense an object proximate to a physical capacitive sensing reference surface. The capacitive sensing apparatus also includes a plurality of dielectric materials disposed between the capacitive sensor and the physical capacitive sensing reference surface. Note that at least one of the plurality of dielectric materials has a non-uniform thickness. The plurality of dielectric materials can be configured such that capacitive coupling between the capacitive sensor and the object proximate to the physical capacitive sensing reference surface is substantially constant across the physical capacitive sensing reference surface.

The drawings referred to in the detailed description should not be understood as being drawn to scale unless specifically noted.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Figure 1:
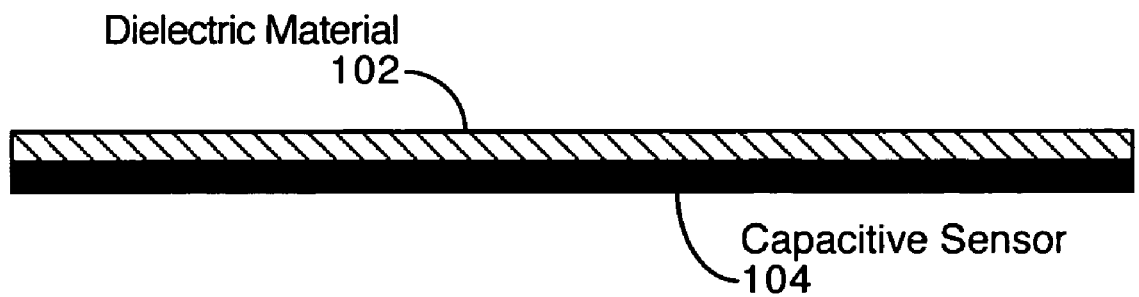
FIG. 1 is a side sectional view of an exemplary conventional art design of a capacitive sensing touchpad.
Figure 2:
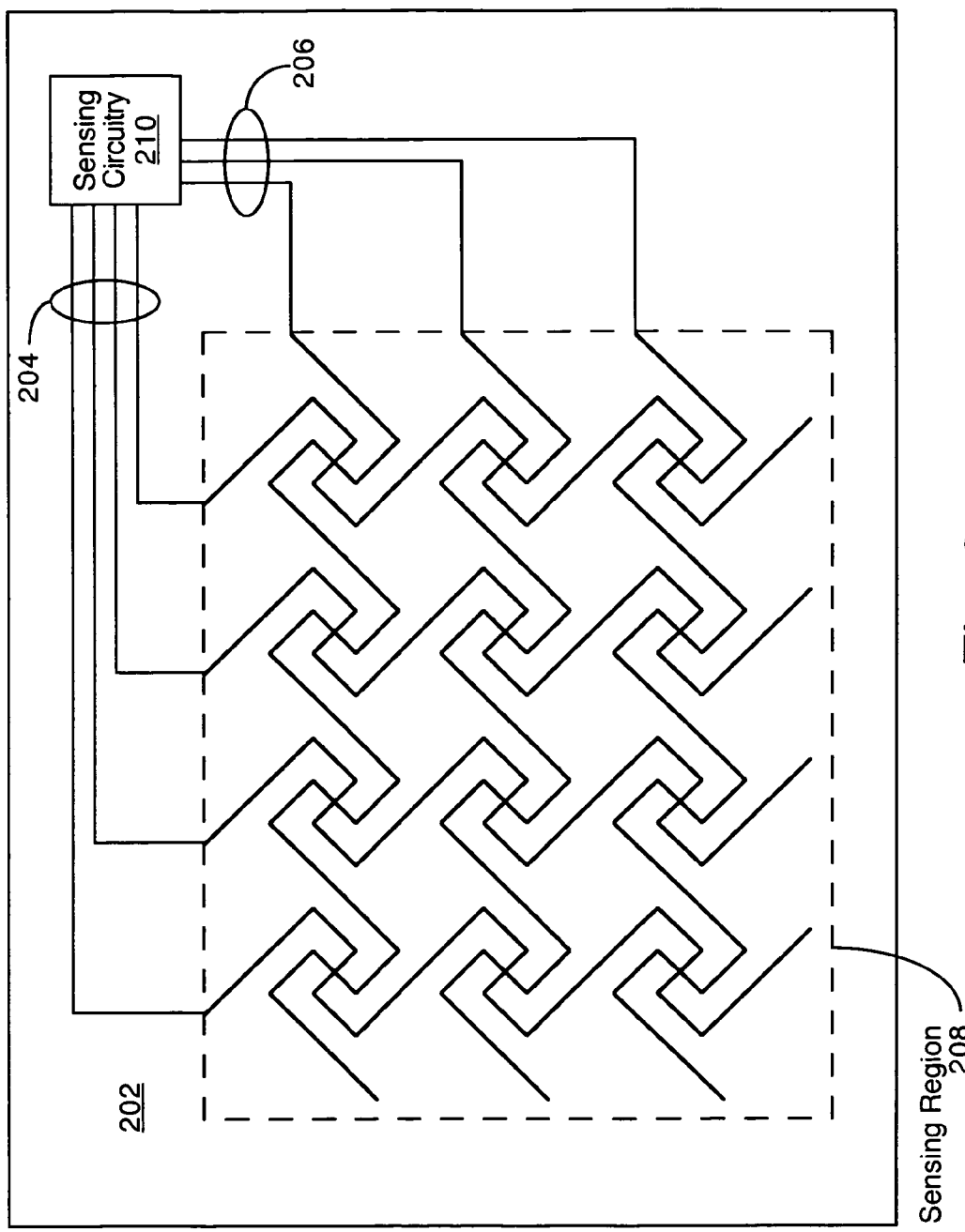
FIG. 2 is a plan view of an exemplary capacitive sensor apparatus that can be implemented to include one or more embodiments in accordance with the invention.

FIG. 2 is a plan view of an exemplary capacitive sensor 200 that can be implemented to include one or more embodiments in accordance with the invention. The capacitive sensor 200 can be utilized to communicate user input (e.g., using a user's finger, a probe, a stylus, or an object) to a computing device or other electronic device. For example, capacitive sensor 200 can be implemented as a capacitive touchpad device that can be disposed in or on a computing device or other electronic device to enable user interfacing with the computing or electronic device. Note that one or more embodiments in accordance with the invention can be incorporated with a capacitive touchpad device similar to capacitive sensor 200.

The capacitive sensor 200 when implemented as a touchpad can include a substrate 202 having a first set of conductive traces 204 and optionally a second set of conductive traces 206 patterned (or formed) thereon. Substrate 202 of capacitive sensor 200 can be implemented with, but is not limited to, one or more insulating materials that are utilized as a substrate for a capacitive touchpad device. The combination of the sets of conductive traces 204 and 206 defines a sensing region 208 of capacitive sensor 200. Note that the sensing pattern shown within sensing region 208 is exemplary. As such, sensing region 208 can include any type of sensing pattern formed by the set of conductive traces 204 and the set of conductive traces 206. The sets of conductive traces 204 and 206 can be coupled to sensing circuitry 210, thereby enabling the operation of capacitive sensor 200. Although FIG. 2 shows two sets of conductive coupling traces 204 and 206, each including multiple conductive traces, the capacitive sensor 200 may be implemented with only one set of conductive traces, and/or only one conductive trace or element per set. It is also noted that the exemplary sensing element pattern shown within sensing region 208 is one of any number of sensing element pattern that can be implemented in accordance with various embodiments of the invention. For example, the capacitive sensor 200 can be implemented as a matrix of intersecting electrodes (such as the one shown) or alternate patterns with or without intersecting electrodes. Although the capacitive sensor 200 is also shown having a rectilinear characteristic, it is not limited to such, and can be implemented having a round or ring-like characteristic, or any other shape having any number of straight or curved aspects. The capacitive sensor 200 can also be implemented as a two-dimensional capacitive sensor (such as the one shown), or as a one-dimensional capacitive sensor (not shown), but is not limited to such.

Figure 3:
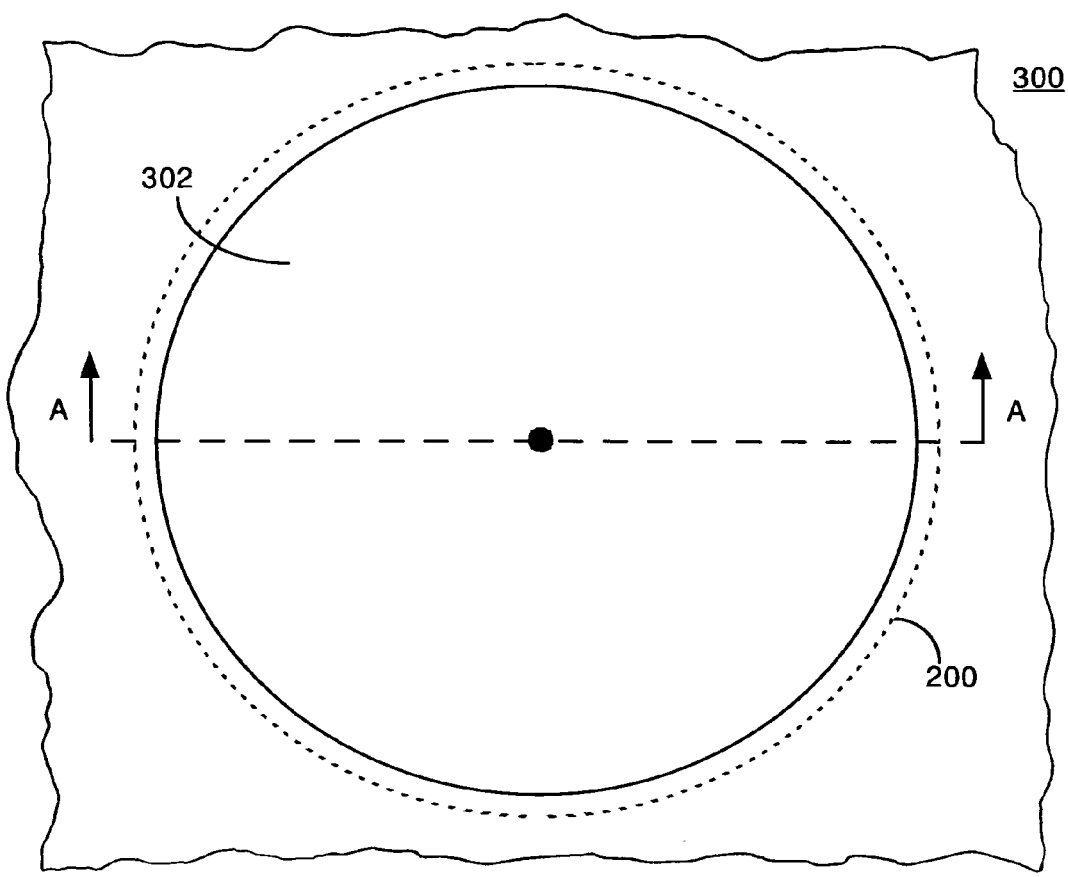
FIG. 3 is a top view of an exemplary capacitive sensing apparatus in accordance with various embodiments of the invention.
Figure 4:
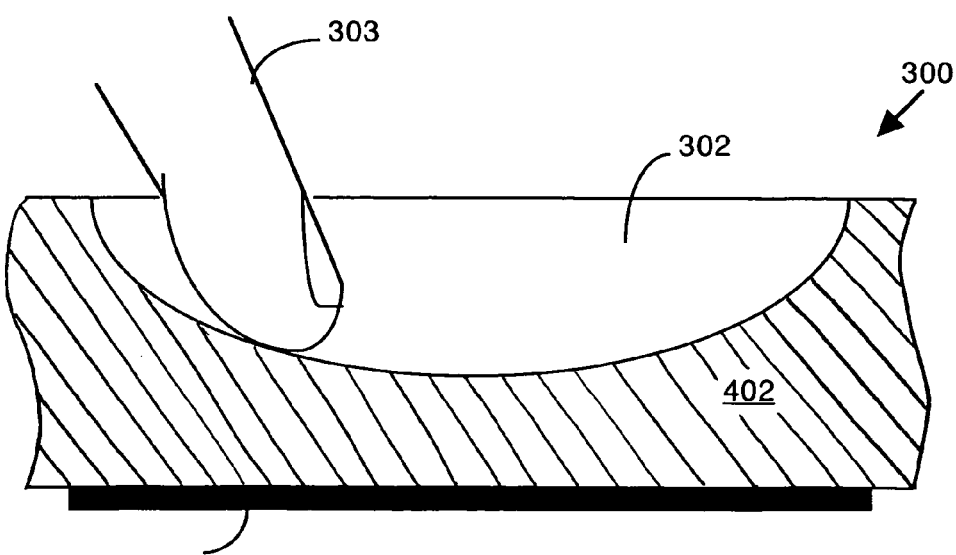
FIG. 4 is an exemplary side sectional view of a capacitive sensing apparatus of FIG. 3.

FIG. 3 is a top view of an exemplary capacitive sensing apparatus 300 that includes a concave bowl shaped physical (i.e. tangible) capacitive sensing reference surface 302 in accordance with various embodiments of the invention. Additionally, FIG. 4 is a side sectional view from viewpoint A-A of the capacitive sensing apparatus 300. Within FIGS. 3 and 4, the capacitive sensing apparatus 300 includes a capacitive sensor 200 configured to sense object 303 (e.g., a user's finger, a probe, a stylus, and the like) proximate to the physical capacitive sensing reference surface 302.

The capacitive sensing reference surface 302 can be the upper surface of a dielectric material 402, which has non-uniform thickness. It is noted that the capacitive coupling (or specific capacitance per unit area) between the capacitive sensor 200 and an object (e.g., finger 303) proximate to the physical capacitive sensing reference surface 302 is non-uniform as object 303 moves across the physical capacitive sensing reference surface 302. One way to compensate for the non-uniform capacitive coupling signal output by capacitive sensor 300 is to utilize circuitry and/or software that can be associated with sensing circuitry 210.

Figure 5:
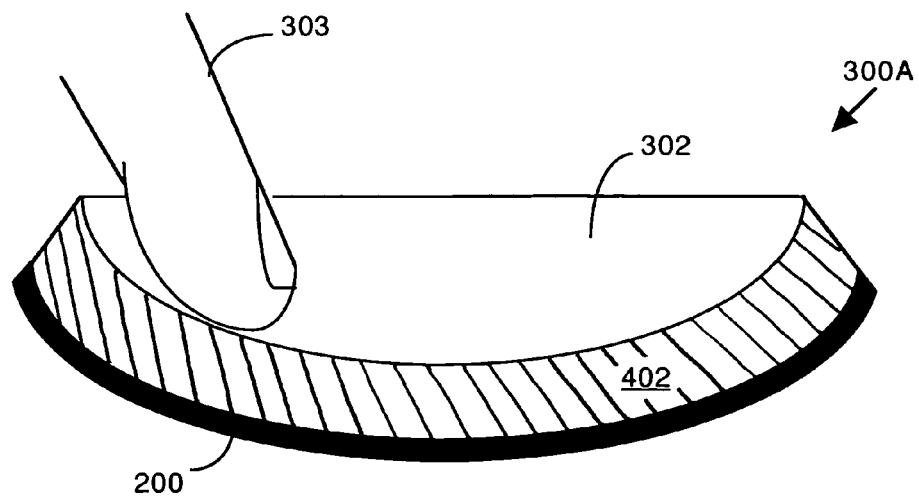
FIG. 5 is an exemplary side sectional view of another capacitive sensing apparatus of FIG. 3.

FIG. 5 is a side sectional view from viewpoint A-A of an exemplary capacitive sensing apparatus 300A that includes a concave bowl shaped physical (i.e. tangible) capacitive sensing reference surface 302. The capacitive sensing apparatus 300A includes capacitive sensor 200 configured to sense an object (e.g., a user's finger, a probe, a stylus, and the like) 303 proximate to the physical capacitive sensing reference surface 302. The capacitive sensing reference surface 302 can be the upper surface of the dielectric material 402, which has a substantially uniform thickness. Furthermore, the capacitive sensor 200 has been implemented in a concave shape that substantially follows the concave shape of capacitive sensing reference surface 302. It is understood that the capacitive coupling (or specific capacitance per unit area) between the capacitive sensor 200 and an object (e.g., finger 303) proximate to the physical capacitive sensing reference surface 302 is substantially uniform as object 303 moves across the physical capacitive sensing reference surface 302. As such, typical sensing circuit 210 can be utilized in conjunction with capacitive sensing apparatus 300A. However, one drawback associated with the capacitive sensing apparatus 300A is that it may be costly to manufacture.

Figure 6:
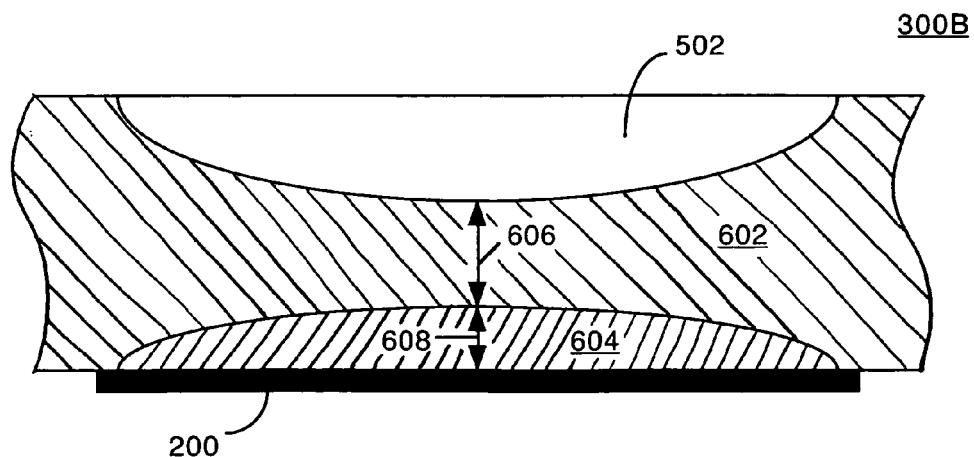
FIG. 6 is an exemplary side sectional view of a capacitive sensing apparatus of FIG. 3 in accordance with various embodiments of the invention.

FIG. 6 is a side sectional view from viewpoint A-A of the capacitive sensing apparatus 300B in accordance with various embodiments of the invention. Within FIGS. 3 and 6, the capacitive sensing apparatus 300B includes capacitive sensor 200 configured to sense object 303 (e.g., a user's finger, a probe, a stylus, and the like) proximate to the physical capacitive sensing reference surface 502. It is appreciated that the capacitive sensing apparatus 300B can include a plurality of dielectric materials (e.g., 602 and 604) disposed between the capacitive sensor 200 and the physical capacitive sensing reference surface 502.

The capacitive sensor 200 can be circular in some embodiments to match the two-dimensional projection of the physical capacitive sensing reference surface 502, but it can also be some other shape that allows sensing at least within the capacitive sensing reference surface 502. The areas outlined by dielectric materials 602 and 604 can differ from each other in the shape or size. The areas outlined by dielectric materials 602 and 604 can also be substantially the same or differ from the area outlined by the capacitive sensing reference surface 502. For example, dielectric materials 602 and 604 can fall within or extend beyond the area outlined by the capacitive sensing reference surface 502. Also, the size or shape of capacitive sensor 200 can extend (as shown) beyond, fall within, or be substantially the same as the area outlined capacitive sensing reference surface 502. Note that at least one of the plurality of dielectric materials (e.g., 602 and 604) can have a non-uniform thickness. The actual size and shape chosen would in part be determined by the exact sensing technology and implementation of capacitive sensing apparatus 300B. Dielectric materials 602 and 604 are configured such that capacitive coupling (or specific capacitance per unit area) between the capacitive sensor 200 and an object, e.g., 303, (not shown) proximate to the physical capacitive sensing reference surface 502 is substantially constant as the object moves across the physical capacitive sensing reference surface 502. In this manner, standard sensing circuitry can be utilized in conjunction with capacitive sensing apparatus 300B without needing any compensation circuitry or software. It is noted that capacitive sensing apparatus 300B can be inexpensive to design and fabricate since it can incorporate a substantially flat or planar capacitive sensor 200.

For example, the capacitive sensing apparatus 300B can include (as shown) the dielectric materials 602 and 604, which are juxtaposed and are different dielectric materials. Therefore, the amount and location of a first dielectric material (e.g., 602) and the amount and location of a second dielectric material (e.g., 604) together affect capacitive coupling. Since at least one of the dielectric materials (e.g., 602) of capacitive sensing apparatus 300B has varying thickness, at least one other dielectric material (e.g., 604) also has a varying thickness such that its effects can be utilized to offset the varying capacitance caused by the change in thickness of dielectric material 602. It is noted that one or more different dielectric materials (e.g., 604) can be utilized to offset the varying capacitive coupling caused by the change in thickness of dielectric material 602.

For a fixed dielectric constant for dielectric material 602, the thickness of dielectric material 604 can be varied so that the net capacitive coupling (or specific capacitance per unit area) between the capacitive sensor 200 and an object (e.g., 303) proximate to the physical (or tangible) capacitive sensing reference surface 502 is substantially constant as the object moves across the physical capacitive sensing reference surface 502. By selecting different values for the shapes and dielectric constants of dielectric materials 602 and 604, the capacitive coupling can be actively controlled. In general, the dielectric constant is fixed for a given material. So for a specific material, its thickness is one factor that can be varied to control the capacitance.

For instance, if dielectric material 602 having vary thickness as shown in FIG. 6 is implemented as a plastic having variable thickness and a dielectric constant approximately equal to 4, and the dielectric material 604 when implemented as air has a dielectric constant approximately equal to 1, dielectric material 604 can be disposed with varying thickness (as shown) in order to offset the variation in capacitance caused by the vary thickness of dielectric material 602. For example, arrow 606 indicates where dielectric material 602 is at its thinnest while arrow 608 indicates where dielectric material 604 is at its thickest.

It is appreciated that there are a wide variety of ways to model capacitive coupling to define the configuration of one or more dielectric materials in accordance with the invention. For example, these models can be used to define the thickness of dielectric material 602, dielectric material 604, and/or other materials in a capacitive sensing apparatus such that capacitive coupling (or specific capacitance per unit area) between capacitive sensor 200 and an object proximate to a physical capacitive sensing reference surface of the capacitive sensing apparatus is substantially constant as the object moves across the physical capacitive sensing reference surface. These models can also be of varying levels of accuracy and complexity, from simple idealized textbook equations to intricate finite element analyses, and it is well known how to derive approximations from fundamental electromagnetic field equations such as Maxwell's Equations. For example, an ideal parallel plate capacitor model of two conductive plates separated by one dielectric material means that the resulting capacitive coupling between the two conductive plates is proportional to the dielectric constant of the dielectric material and inversely proportional to the thickness of the dielectric material.

Figure 7:
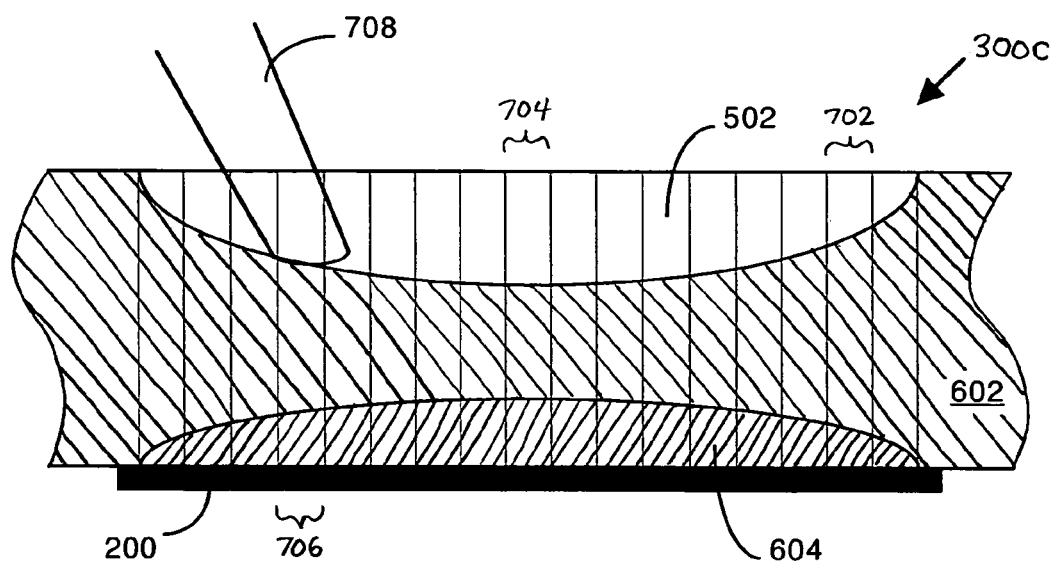
FIG. 7 is another exemplary side sectional view of the capacitive sensing apparatus of FIG. 3 in accordance with various embodiments of the invention.

FIG. 7 illustrates a side sectional view from viewpoint A-A of capacitive sensing apparatus 300C wherein each section (e.g., 702, 704 or 706) near A-A has approximately the same specific capacitance per unit area, in accordance with various embodiments of the invention. Therefore, when an object 708 (e.g., a probe, a user's finger, a stylus, and the like) contacts the physical or tangible capacitive sensing reference surface 502 of the capacitive sensing apparatus 300C within section 706, the capacitive coupling (or specific capacitance per unit area) between object 708 and capacitive sensor 200 within section 706 will be approximately or substantially constant when compared to when object 708 alternatively contacts the physical capacitive sensing reference surface 502 within section 702 or 704. As such, the capacitive sensing apparatus 300C has substantially the same sensitivity everywhere on reference surface 502 to a uniform object (e.g., 708) even though object 708 is at different distances from the capacitive sensor 200. Therefore, the sensing signals of the capacitive sensing apparatus 300C are substantially on the same scale, thereby enabling approximately the same gain to be increased on all the sensing signals received from capacitive sensing apparatus 300C.

Note that object 708 can be utilized with any capacitive sensing apparatus (e.g., 300, 300A, 300B, 300C, 300D, 300E, 300F, 1100, 1400 and 1600) that is mentioned herein.

It accordance with the invention, it is understood that any dielectric materials (e.g., 302, 402, 602 and 604) can be implemented in a wide variety of ways. For example, each of dielectric materials 602 and 604 can be implemented with, but is not limited to, one or more polymers, one or more plastics, one or more foam materials, one or more gases (e.g., air), and the like. Within the capacitive sensing apparatus 300C, the physical capacitive sensing reference surface 502 can be implemented in any non-flat manner, such that it includes, but is not limited to, any combination of flat, concave, convex, conical, wavy, triangular saw-toothed, pyramidal, V-shaped, U-shaped, and/or any arbitrary non-uniformly flat shapes.

Within capacitive sensing apparatus 300, 300A, 300B, 300C and the like, it is appreciated that capacitive sensor 200 can be implemented as one or more sensing traces or elements and the sensing circuitry or electronics (e.g., 210) can be located somewhere else. Furthermore, the capacitive sensor 200 in accordance with various embodiments of the invention can be implemented such that it is substantially flat or planar, but is not limited to such. For example, in accordance with various embodiments of the invention, the capacitive sensor 200 can be implemented such that is substantially curved or non-planar, but is not limited to such.

Within FIGS. 6 and 7, it is understood that the plurality of dielectric materials (e.g., 602 and 604) of the capacitive sensing apparatuses 300B and 300C may not be implemented as layers. Instead, within various embodiments, one dielectric material (e.g., 602) can internally include one or more regions or sections of another dielectric material (e.g., 604) in order to provide capacitive coupling (or specific capacitance per unit area) between the capacitive sensor 200 and an object (e.g., 303 or 708) proximate to the physical (i.e. tangible) capacitive sensing reference surface 502 that is substantially constant as the object moves across the physical capacitive sensing reference surface 502.

Figure 8:
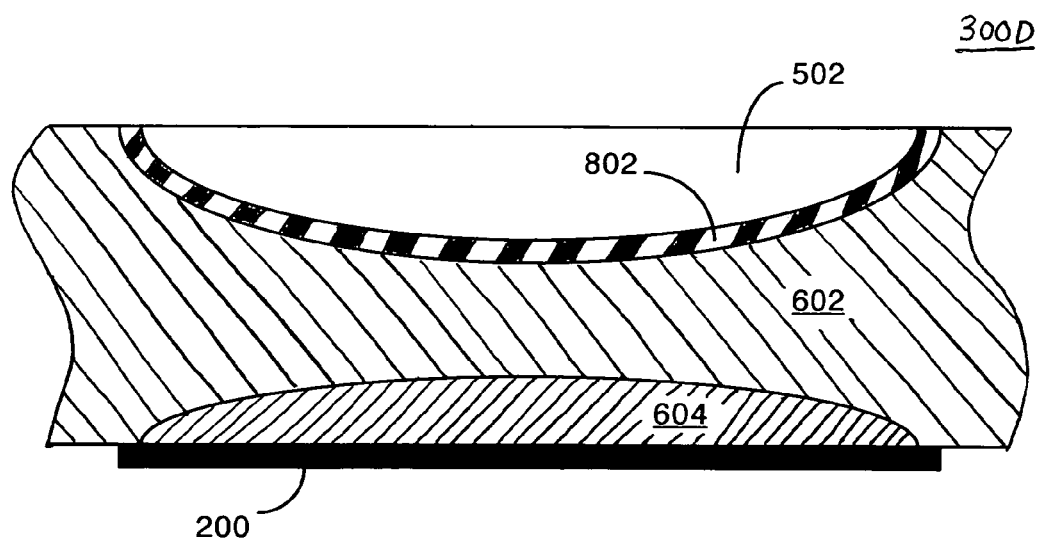
FIG. 8 is yet another exemplary side sectional view of capacitive sensing apparatus of FIG. 3 in accordance with various embodiments of the invention.

FIG. 8 illustrates a side sectional view from viewpoint A-A of capacitive sensing apparatus 300D implemented with an additional material 802 that has a substantially uniform thickness in accordance with various embodiments of the invention. In other embodiments, material 802 has varying thickness and is configured along with dielectric materials 602 and 604 to achieve uniform capacitive coupling. In many cases, material 802 will also be a dielectric, although material 802 may be semi-conductive or conductive in some cases to improve sensing or for electric shielding. Material 802 may also be patterned, such as to achieve the desired aesthetic appeal, tactile feel, or electrical effects on the sensing or shielding properties of capacitive sensing apparatus 300D. It is appreciated that material 802 can be implemented as a touch surface material that provides a contact surface for an object (e.g., 303 or 708) interfacing with the capacitive sensing apparatus 300D. Material 802 can alternatively be interposed between dielectric materials 602 and 604, between dielectric material 604 and capacitive sensor 200 such that it is closer to dielectric material 604 instead of dielectric material 602, or anywhere else as long as it resides at least partially between the capacitive sensor 200 and the capacitive sensing reference surface 502. Material 802 can be disposed against the plurality of dielectric materials (e.g., 602 and 604) of capacitive sensing apparatus 300D such that there is physical contact between material 802 and at least one of the dielectric materials 602 and 604. Additional materials can also be included (not shown) in addition to dielectric materials 602 and 604, and material 802.

Within FIGS. 6 and 7, the physical (tangible) capacitive sensing reference surface 502 in accordance with various embodiment can be defined as the active area where capacitive coupling (specific capacitance per unit area) between an object (e.g., 303 or 708) and the capacitive sensor 200 is substantially constant across capacitive sensing reference surface 502. It is appreciated that the physical (or tangible) capacitive sensing reference surface 502 can be implemented as, but is not limited to, at least part of a touch surface material (e.g., 802 of FIG. 8) or at least part of the top surface of a dielectric material (e.g., 602 as shown in FIGS. 6 and 7).

Figure 9:
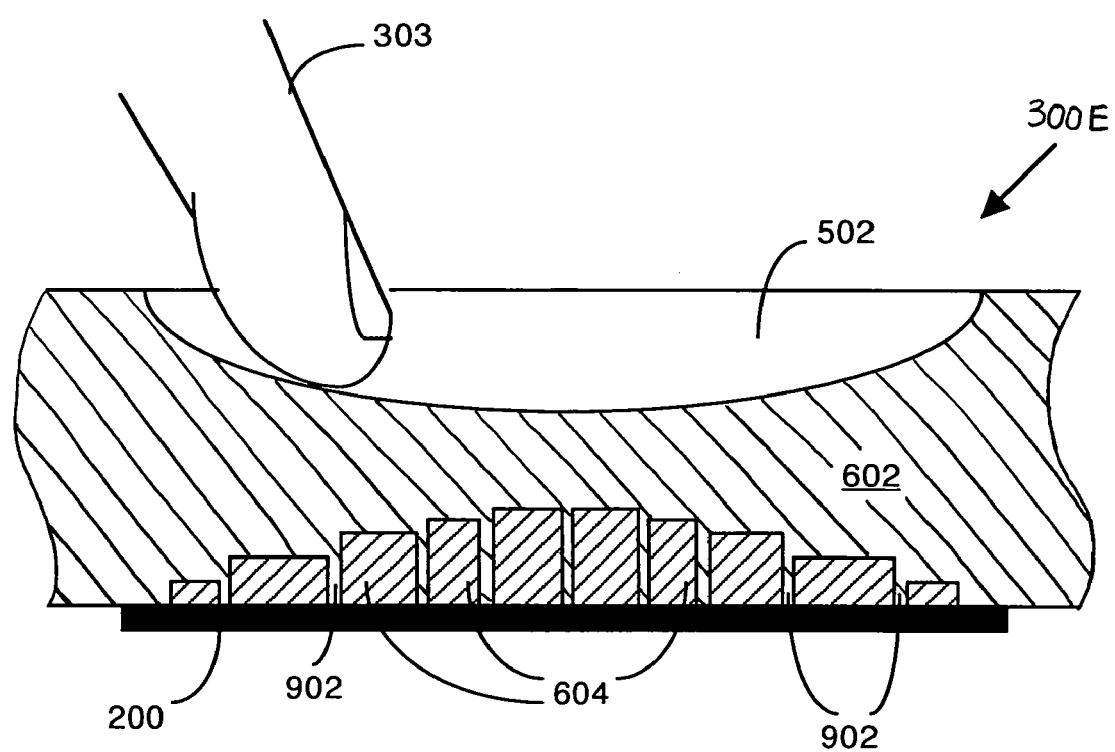
FIG. 9 is still another exemplary side sectional view of capacitive sensing apparatus of FIG. 3 in accordance with various embodiments of the invention.

FIG. 9 illustrates a side sectional view from viewpoint A-A of capacitive sensing apparatus 300E wherein dielectric material 604 has been implemented in regions defined by dielectric material 602 and capacitive sensor 200 in accordance with various embodiments of the invention. It is understood that one or more additional different dielectric materials can be implemented within capacitive sensing apparatus 300E in a manner similar to dielectric material 602, but is not limited to such. It is appreciated that by implementing dielectric material 604 as shown in FIG. 9, structural support and stability can be provided to dielectric material 602 and capacitive sensing apparatus 300E by supports 902 when an object (e.g., finger 303) is pressed against its physical (i.e., tangible) capacitive sensing reference surface 502. It is noted that supports 902 can be implemented such that they are narrow in comparison to the size of the physical capacitive sensing reference surface 502. In this manner, supports 902 will not substantially affect the resulting capacitive coupling between an object (e.g., finger 303, and the like) and capacitive sensor 200 as the object is moved across capacitive sensing reference surface 502.

Figure 10:
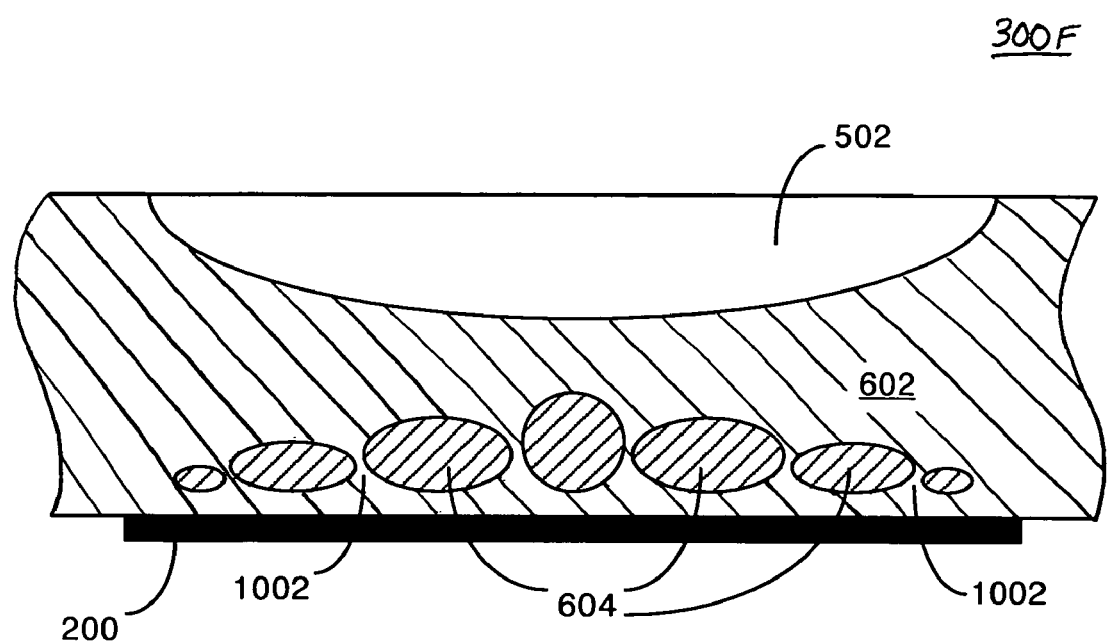
FIG. 10 is another exemplary side sectional view of capacitive sensing apparatus of FIG. 3 in accordance with various embodiments of the invention.

FIG. 10 illustrates a side sectional view from viewpoint A-A of capacitive sensing apparatus 300F wherein dielectric material 604 has been implemented as elliptical regions and a circular region defined by dielectric material 602 in accordance with various embodiments of the invention. Note that one or more additional different dielectric materials can be implemented within capacitive sensing apparatus 300F in a manner similar to dielectric material 602, but is not limited to such. By implementing dielectric material 604 as shown in FIG. 10, structural support and stability can be provided to dielectric material 602 and capacitive sensing apparatus 300F by supports 1002 when an object (e.g., 303 or 708) is pressed against its physical capacitive sensing reference surface 502. It is understood that supports 1002 can be implemented such that they are narrow in comparison to the size of the physical capacitive sensing reference surface 502. In this fashion, supports 1002 will not substantially affect the resulting capacitive coupling between an object (e.g., finger 303, and the like) and capacitive sensor 200 as the object moves across capacitive sensing reference surface 502.

Figure 11:
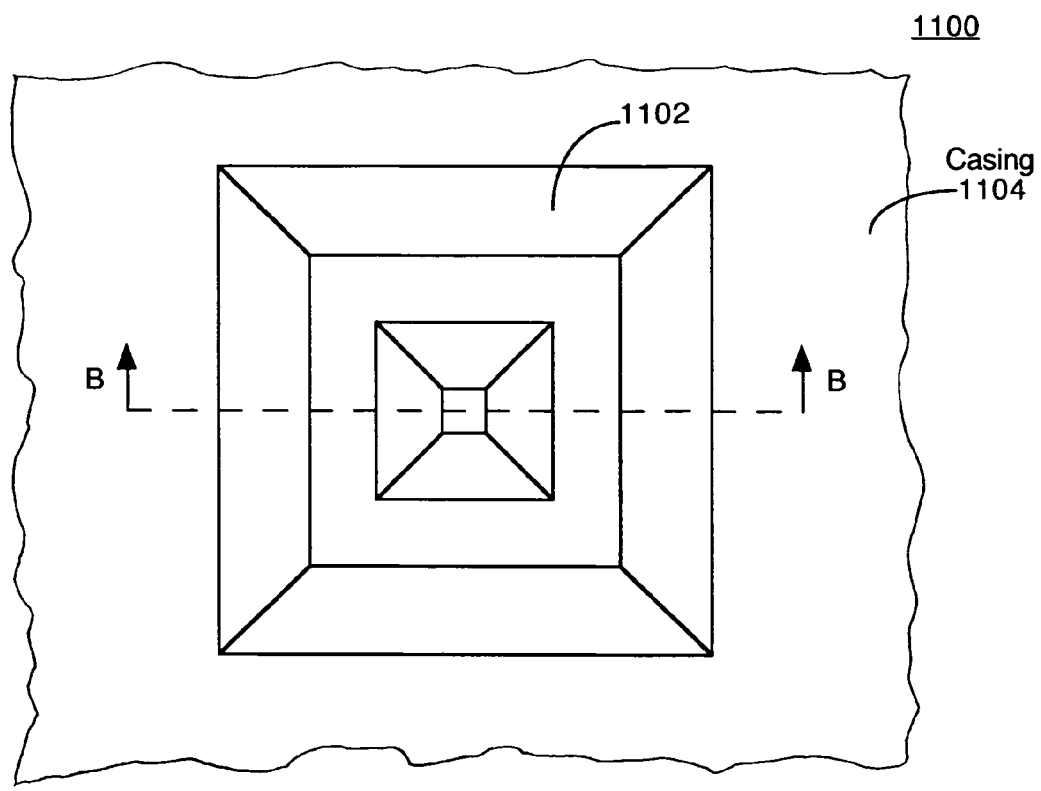
FIG. 11 is a top view of another exemplary capacitive sensing apparatus in accordance with various embodiments of the invention.
Figure 12:
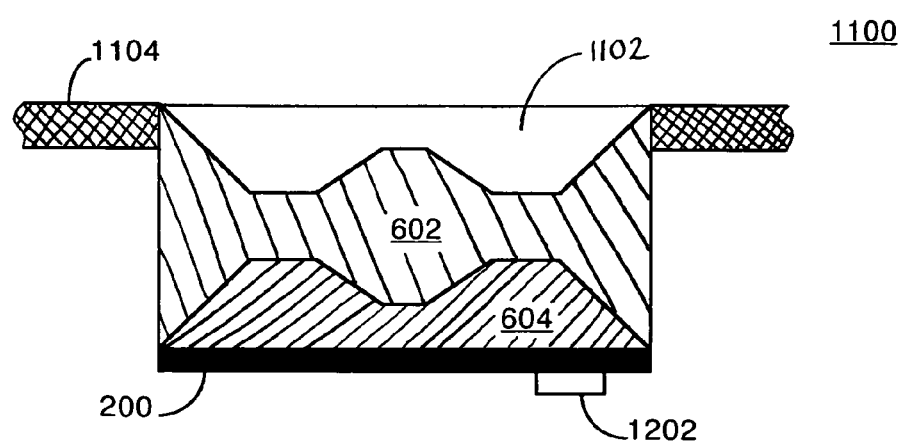
FIG. 12 is an exemplary side sectional view of the capacitive sensing apparatus of FIG. 11 in accordance with various embodiments of the invention.

FIG. 11 is a top view of an exemplary capacitive sensing apparatus 1100 that includes a physical (i.e. tangible) capacitive sensing reference surface 1102 in accordance with various embodiments of the invention. Specifically, the physical capacitive sensing reference surface 1102 can be incorporated within a casing 1104. Furthermore, the physical capacitive sensing reference surface 1102 can include discrete concave regions and discrete convex regions that involve vector linear lines. Note that the physical capacitive sensing reference surface 1102 can be implemented with one or more discrete straight or curved lines in any non-uniform shape, but is not limited to such. FIG. 12 is a side sectional view from viewpoint B-B of the capacitive sensing apparatus 1100 in accordance with various embodiments of the invention.

Within FIGS. 11 and 12, the capacitive sensing apparatus 1100 includes capacitive sensor 200 configured to sense an object (e.g., finger 303, a probe, a stylus, and the like) proximate to the physical capacitive sensing reference surface 1102. The capacitive sensing apparatus 1100 can include a plurality of dielectric materials (e.g., 602 and 604) disposed between the capacitive sensor 200 and the physical capacitive sensing reference surface 1102. The capacitive sensor 200 can be square in some embodiments to match the two-dimensional projection of the physical capacitive sensing reference surface 1102, but it can also be some other shape that allows sensing at least within the capacitive sensing reference surface 1102.

The areas outlined by dielectric materials 602 and 604 can differ from each other in the shape or size. The areas outlined by dielectric materials 602 and 604 of capacitive sensing apparatus 1100 can also be substantially the same or differ from that of the area outlined by the capacitive sensing reference surface 1102. For example, dielectric materials 602 and/or 604 can fall within or extend beyond the area outlined by the capacitive sensing reference surface 1102. Also, the size or shape of capacitive sensor 200 can be such that capacitive sensor 200 is substantially the same (as shown), extend beyond, or fall within the area outlined capacitive sensing reference surface 1102. Thus, the size of capacitive sensor 200 can be smaller or substantially the same as the area of capacitive sensing reference surface 1102. Note that at least one of the plurality of dielectric materials (e.g., 602 and 604) can have a non-uniform thickness. The actual size and shape chosen would in part be determined by the exact sensing technology and implementation of capacitive sensing apparatus 1100. Dielectric materials 602 and 604 are configured such that capacitive coupling (or specific capacitance per unit area) between the capacitive sensor 200 and an object (e.g., 303 or 708) proximate to the physical capacitive sensing reference surface 1102 is substantially constant as the object moves across the physical capacitive sensing reference surface 1102.

For example, the capacitive sensing apparatus 1100 can include (as shown) the dielectric materials 602 and 604, which are juxtaposed and are different dielectric materials. As such, the amount and location of a first dielectric material (e.g., 604) and the amount and location of a second dielectric material (e.g., 602) together affect capacitive coupling. Since at least one of the dielectric materials (e.g., 602) of capacitive sensing apparatus 1100 has varying thickness, at least one other dielectric material (e.g., 604) also has a varying thickness such that its effects can be utilized to offset the varying capacitance caused by the change in thickness of dielectric material 602. Note that one or more different dielectric materials (e.g., 604) can be utilized to offset the varying capacitive coupling caused by the change in thickness of dielectric material 602.

Within FIG. 12, the capacitive sensing apparatus 1100 can include an optional on-board circuitry 1202, which enables the functional operation of capacitive sensor 200. Note that the on-board circuitry can be located in a wide variety of locations associated with capacitive sensing apparatus 1100. Within FIG. 12, the on-board circuitry is coupled to capacitive sensor 200. It is understood that any capacitive sensing apparatus described herein can be implemented with on-board circuitry, such as on-board circuitry 1202.

Figure 13:
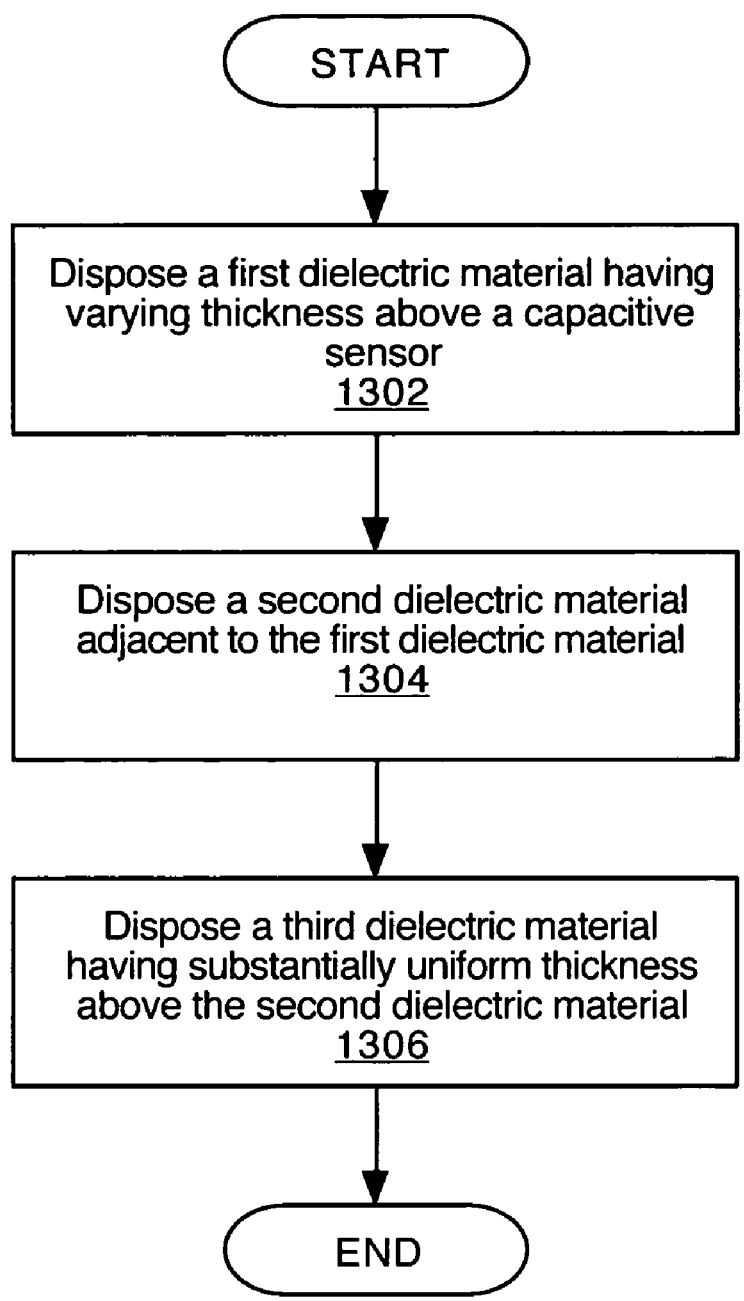
FIG. 13 is a flow diagram of a method in accordance with various embodiments of the invention for forming a capacitive sensor apparatus.

FIG. 13 is a flow diagram of a method 1300 in accordance with various embodiments of the invention for forming a capacitive sensor apparatus. Although specific operations are disclosed in method 1300, such operations are exemplary. That is, method 1300 may not include all of the operations illustrated by the flow diagram in FIG. 13. Alternatively, method 1300 may include various other operations and/or variations of the operations shown by the flow diagram in FIG. 13. Likewise, the sequence of the operations of method 1300 can be modified. Noted that the operations of method 1300 may include utilizing software, firmware, electronic hardware, fabrication hardware tools, or any combination thereof.

Specifically, a first dielectric material having varying thickness can be disposed above a capacitive sensor. Furthermore, a second dielectric material can be disposed adjacent to the first dielectric material. It is noted that the capacitive coupling (specific capacitance per unit area) of the capacitive sensor through the first and second dielectric materials to an object proximate to a physical capacitive sensing reference surface is approximately constant across the physical capacitive sensing reference surface. Moreover, a third dielectric material having substantially uniform thickness can be disposed above the second dielectric material. Note that the third dielectric material can provide a contact surface for the object to touch.

At operation 1302 of FIG. 13, a first dielectric material (e.g., 604) having varying thickness can be disposed above a capacitive sensor (e.g., 200). It is appreciated that operation 1302 can be implemented in a wide variety of ways. For example, the first dielectric material (e.g., gas, air, polymer, plastic, and the like) having varying thickness can be disposed at operation 1302 above a capacitive sensor in any manner similar to that described herein, but is not limited to such.

At operation 1304, a second dielectric material (e.g., 602) can be disposed adjacent to the first dielectric material. Note that the capacitive coupling (specific capacitance per unit area) of the capacitive sensor through said first and second dielectric materials to an object (e.g., 708) proximate to a physical capacitive sensing reference surface (e.g., 502) is approximately constant at different locations across the physical capacitive sensing reference surface. It is appreciated that operation 1304 can be implemented in a wide variety of ways. For example, the second dielectric material can be disposed adjacent to the first dielectric material at operation 1304 in any manner similar to that described herein, but is not limited to such.

At optional operation 1306 of FIG. 13, a third material (e.g., 502), which could be a dielectric having substantially uniform thickness, can be disposed above and/or adjacent to the second dielectric material. It is understood that the third dielectric material can provide a contact surface for the object to touch. Note that operation 1306 can be implemented in wide variety of ways. For example, the third material, which could be a dielectric material having substantially uniform thickness, can be disposed at operation 1306 above and/or adjacent to the second dielectric material in any manner similar to that described herein, but is not limited to such. At the completion of operation 1306, process 1300 can be exited.

Figure 14:
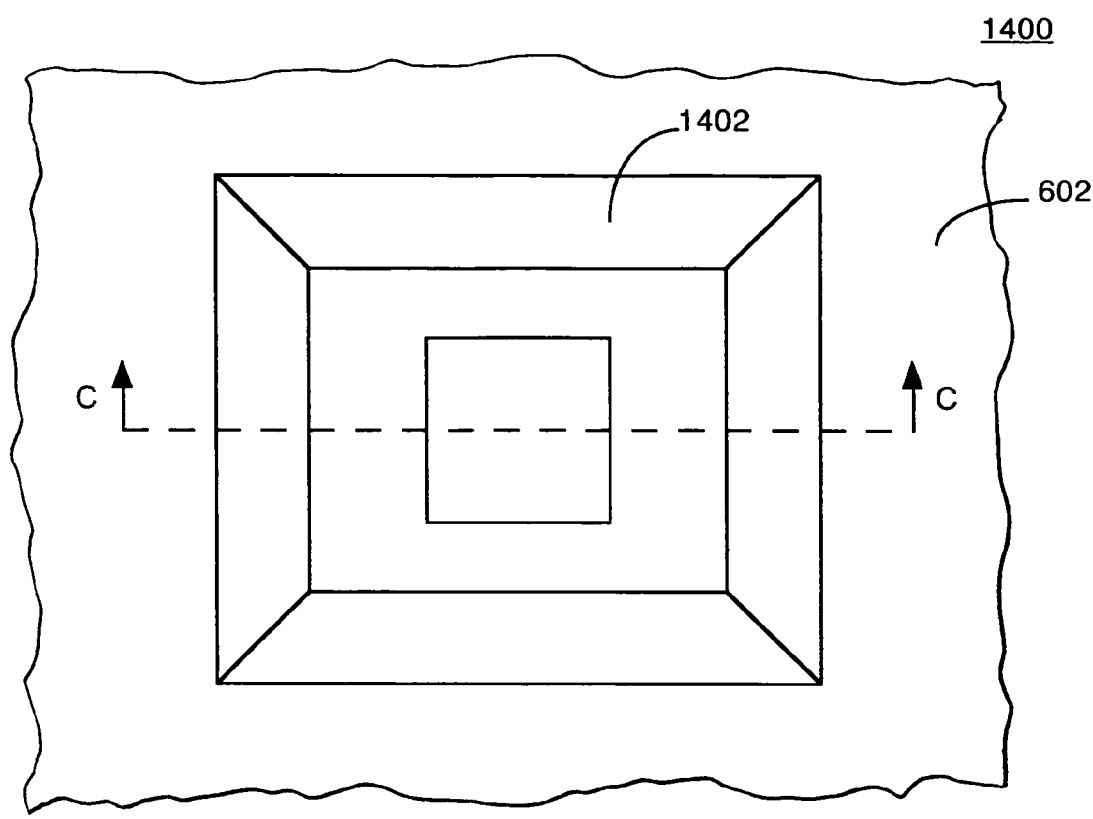
FIG. 14 is a top view of another exemplary capacitive sensing apparatus in accordance with various embodiments of the invention.
Figure 15:
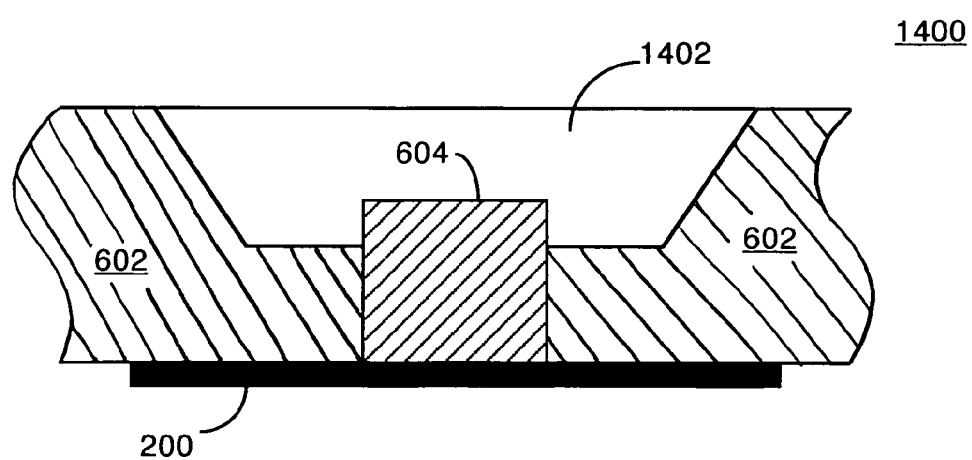
FIG. 15 is an exemplary side sectional view of the capacitive sensing apparatus of FIG. 14 in accordance with various embodiments of the invention.

FIG. 14 is a top view of an exemplary capacitive sensing apparatus 1400 that includes a physical (i.e. tangible) capacitive sensing reference surface 1402 in accordance with various embodiments of the invention. Specifically, the physical capacitive sensing reference surface 1402 can include discrete concave regions and discrete convex regions that involve vector linear lines. It is noted that the physical capacitive sensing reference surface 1402 can be implemented with one or more discrete straight or curved lines in any non-uniform shape, but is not limited to such. FIG. 15 is an exemplary side sectional view from viewpoint C-C of the capacitive sensing apparatus 1400 in accordance with various embodiments of the invention.

Within FIGS. 15, dielectric materials 602 and 604 of capacitive sensing apparatus 1400 do not overlap each other beneath the physical (or tangible) capacitive sensing reference surface 1402. The dielectric materials 602 and 604 have been implemented such that portions of dielectric material 602 are thinner than dielectric material 604 within the area outlined by capacitive sensing reference surface 1402. In accordance with one embodiment, dielectric material 604 can have a higher dielectric constant than dielectric material 602. Therefore, in order to achieve uniform capacitive coupling between capacitive reference surface 1402 and capacitive sensor 200, the thickness of the dielectric material 604 can be greater than the thickness of dielectric material 602 within the area outlined by capacitive sensing reference surface 1402.

As shown by dielectric material 602 of FIG. 15, dielectric material extends beyond the area outlined by capacitive sensing reference surface 1402 and can have varying thickness for aesthetic reasons such as visual appeal, or functional reasons such as visual or tactile feedback or to address electrical fringing effects. It is appreciated that by implementing dielectric materials 602 and 604 as shown in FIG. 15, tactile and visual feedback can be provided to an object (not shown) interacting with the capacitive sensing surface 1402 and will not substantially affect the resulting capacitive coupling between the object and capacitive sensor 200 as the object moves across the physical capacitive sensing reference surface 1402.

Figure 16:
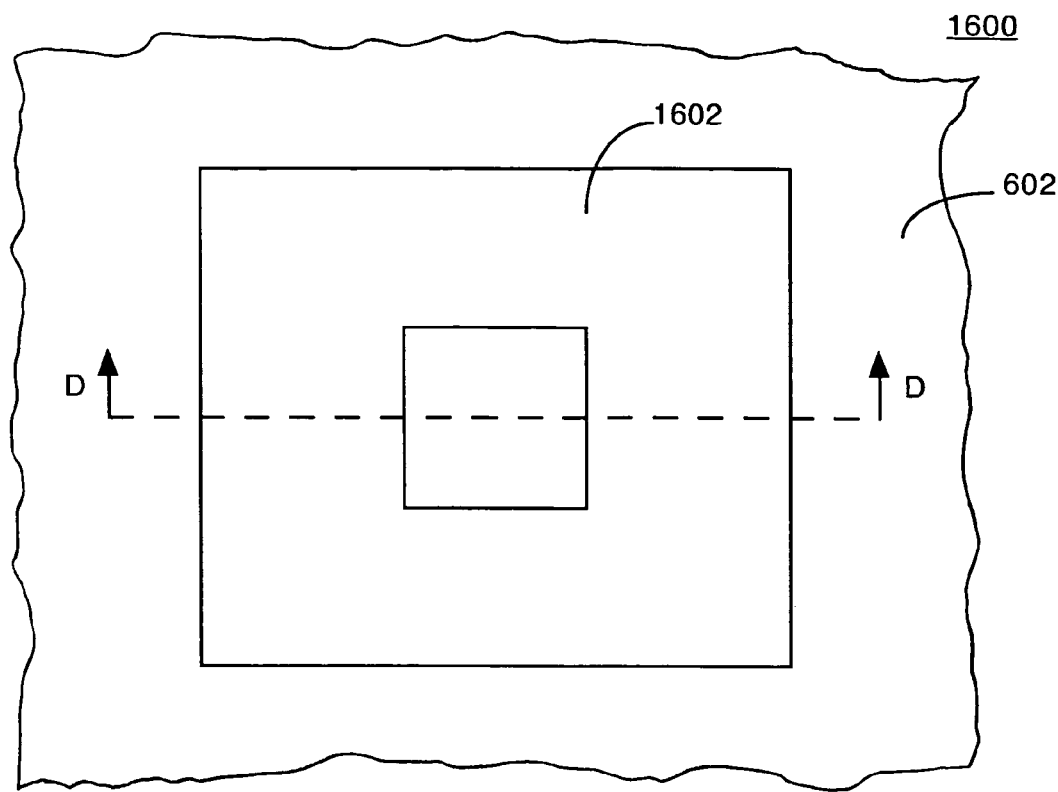
FIG. 16 is a top view of yet another exemplary capacitive sensing apparatus in accordance with various embodiments of the invention.
Figure 17:
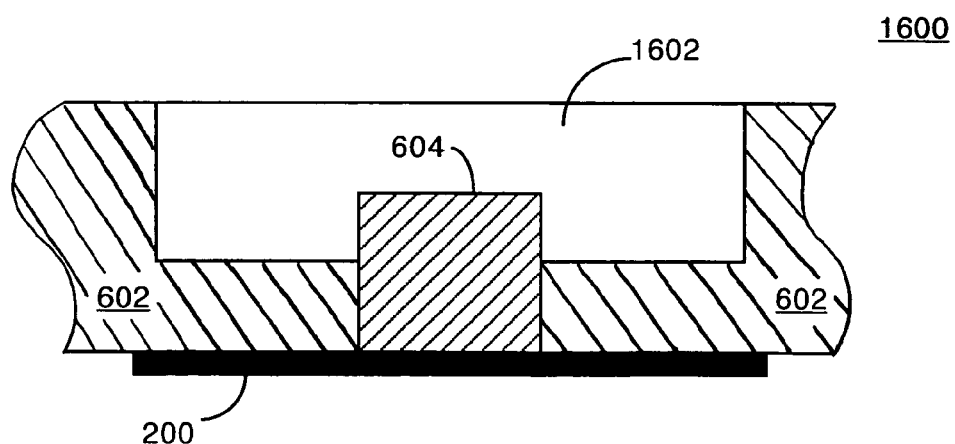
FIG. 17 is an exemplary side sectional view of the capacitive sensing apparatus of FIG. 16 in accordance with various embodiments of the invention.

FIG. 16 is a top view of an exemplary capacitive sensing apparatus 1600 that includes a physical (i.e. tangible) capacitive sensing reference surface 1602 in accordance with various embodiments of the invention. Specifically, the physical capacitive sensing reference surface 1602 can include discrete concave regions and discrete convex regions that involve vector linear lines. It is appreciated that the physical capacitive sensing reference surface 1602 can be implemented with one or more discrete straight or curved lines in any non-uniform shape, but is not limited to such. FIG. 17 is an exemplary side sectional view from viewpoint D-D of the capacitive sensing apparatus 1600 in accordance with various embodiments of the invention.

Within FIG. 17, dielectric materials 602 and 604 of capacitive sensing apparatus 1600 do not overlap each other beneath a physical (or tangible) capacitive sensing reference surface 1602. Dielectric materials 602 and 604 of capacitive sensing apparatus 1600 have been implemented such that some portions of dielectric material 602 are thinner than dielectric material 604 within the area outlined by capacitive sensing reference surface 1602. Additionally, neither dielectric material 602 nor dielectric material 604 has varying thickness within the area outlined by capacitive sensing reference surface 1602. Within one embodiment, dielectric material 604 can have a higher dielectric constant than dielectric material 602. Therefore, in order to achieve uniform capacitive coupling between capacitive reference surface 1602 and capacitive sensor 200, the thickness of the dielectric material 604 can be greater than the thickness of dielectric material 602 within the area outlined by capacitive sensing reference surface 1602.

It is understood that dielectric material 602 (as shown) of capacitive sensing apparatus 1600 extends beyond the area outlined by capacitive sensing reference surface 1602 and can have varying thickness for aesthetic reasons such as visual appeal, or functional reasons such as visual or tactile feedback or to address electrical fringing effects. By implementing dielectric materials 602 and 604 as shown in FIG. 17, tactile and visual feedback can be provided to an object (not shown) interacting with the capacitive sensing surface 1602 and will not substantially affect the resulting capacitive coupling between the object and capacitive sensor 200 as the object moves across the physical capacitive sensing reference surface 1602.

Within FIG. 2, the capacitive sensor 200 can also be implemented as a capacitive touch screen device. For example, substrate 202 of capacitive sensor 200 can be implemented with, but is not limited to, one or more substantially transparent materials that are utilized as a substrate for a capacitive touch screen device.

It is noted that if it was not desirable to achieve uniform capacitance per unit area (or capacitive coupling), but instead a controlled capacitance per unit area, techniques similar to those described herein can be utilized in order to produce any desired capacitive per unit area function. By using any combination of the methods described herein, it is possible to control the capacitive profile of the reference surface to the capacitive sensor.

The foregoing descriptions of specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A capacitive sensing apparatus comprising:
   a capacitive sensor configured to sense an object proximate to a physical capacitive sensing reference surface; and
   a plurality of dielectric materials disposed between the capacitive sensor and the physical capacitive sensing reference surface, at least one of said plurality of dielectric materials having non-uniform self thickness,
   wherein said plurality of dielectric materials is configured such that capacitive coupling between said capacitive sensor and said object proximate to said physical capacitive sensing reference surface is substantially constant across said physical capacitive sensing reference surface.

2. The capacitive sensing apparatus of claim 1, wherein at least one of said plurality of dielectric materials is comprised of a foam material.

3. The capacitive sensing apparatus of claim 1, wherein at least one of said plurality of dielectric materials is comprised of a gas.

4. The capacitive sensing apparatus of claim 3, wherein said gas comprises air.

5. The capacitive sensing apparatus of claim 3, wherein at least one of said plurality of dielectric materials is comprised of a polymer.

6. The capacitive sensing apparatus of claim 1, wherein said physical capacitive sensing reference surface is not uniformly flat.

7. The capacitive sensing apparatus of claim 1, wherein said physical capacitive sensing reference surface is concave.

8. The capacitive sensing apparatus of claim 1, wherein said physical capacitive sensing reference surface is convex.

9. The capacitive sensing apparatus of claim 1, wherein at least one of said plurality of dielectric materials has a substantially uniform self thickness.

10. The capacitive sensing apparatus of claim 1, further comprising a touch surface material disposed against said plurality of dielectric materials, said touch surface material configured to provide a contact surface for said object.

11. A capacitive sensing apparatus comprising:
    a two-dimensional capacitive sensor configured to sense an object proximate to a tangible capacitive sensing reference surface; and
    a plurality of layers of dielectric material disposed between said two-dimensional capacitive sensor and said tangible capacitive sensing reference surface, at least one of said plurality of layers of dielectric material having varying self thickness,
    wherein said plurality of layers of capacitive material is configured such that the specific capacitance per unit area between said two-dimensional capacitive sensor and said conductive object proximate to said tangible capacitive sensing reference surface remains approximately constant across said tangible capacitive sensing reference surface.

12. The capacitive sensing apparatus of claim 11, wherein at least one of said plurality layers of dielectric material is comprised of a gas.

13. The capacitive sensing apparatus of claim 12, wherein said gas comprises air.

14. The capacitive sensing apparatus of claim 11, wherein at least one of said plurality layers of dielectric material is comprised of a polymer.

15. The capacitive sensing apparatus of claim 11, wherein said tangible capacitive sensing reference surface is not uniformly flat.

16. The capacitive sensing apparatus of claim 11, wherein said tangible capacitive sensing reference surface is concave.

17. The capacitive sensing apparatus of claim 11, wherein said tangible capacitive sensing reference surface is convex.

18. A method comprising:
    disposing a first dielectric material having varying thickness above a capacitive sensor; and
    disposing a second dielectric material adjacent to said first dielectric material;
    wherein capacitive coupling of said capacitive sensor through said first and second dielectric materials to an object proximate to a physical capacitive sensing reference surface is approximately constant across said physical capacitive sensing reference surface.

19. The method of claim 18, wherein said first dielectric material comprises a gas.

20. The method of claim 18, wherein said second dielectric material comprises a polymer.

21. The method of claim 18, further comprising:
    disposing a third dielectric material having substantially uniform thickness above said second dielectric material, said third dielectric material provides a contact surface for said object.

22. The method of claim 18, wherein said physical capacitive sensing reference surface is not uniformly flat.

* * * * *